United States Patent [19]

O'Brien

[11] Patent Number: 4,639,081
[45] Date of Patent: Jan. 27, 1987

[54] GIMBALLED THREE-DIMENSIONAL DISPLAY SYSTEM

[75] Inventor: Thomas P. O'Brien, Deerfield, Ill.

[73] Assignee: Kabushiki Kaisha Toshiba, Kawasaki, Japan

[21] Appl. No.: 766,018

[22] Filed: Aug. 15, 1985

[51] Int. Cl.⁴ .................. G02B 7/18; G02B 27/22; G02B 17/00; G02B 5/10
[52] U.S. Cl. .................. 350/144; 350/608; 350/636; 350/637; 340/755
[58] Field of Search .......... 350/608, 632, 637, 144, 350/143, 130, 131, 636; 248/487; 358/89; 340/755, 709

[56] References Cited

U.S. PATENT DOCUMENTS

| | | | |
|---|---|---|---|
| 3,371,155 | 2/1968 | Andersen | 350/608 |
| 3,493,290 | 2/1970 | Traub | 350/608 |
| 3,995,944 | 12/1976 | Queeney | 350/636 |
| 4,130,832 | 12/1978 | Sher | 350/608 |
| 4,462,044 | 7/1984 | Thomason et al. | 340/755 |

OTHER PUBLICATIONS

"A New 3-Dimensional Display Technique", by Alan C. Traub, May, 1968.

Primary Examiner—Jon W. Henry
Attorney, Agent, or Firm—Finnegan, Henderson, Farabow, Garrett & Dunner

[57] ABSTRACT

A three-dimensional display system comprising a display member on which viewing perspective changes as a function of viewing angle and a two axis remote control gimbal onto which the display is mounted to permit a user of the display to maintain contact with a control console while changing the angular view of the display.

7 Claims, 2 Drawing Figures

GIMBALLED THREE-DIMENSIONAL DISPLAY SYSTEM

BACKGROUND OF THE INVENTION

I. Field of the Invention

The present invention relates to a three-dimensional display system which includes a volumetric display member upon which an image is displayed in a manner whereby the perspective view of that image may be changed by changing the viewing angle to the display member.

II. Background Information

Volumetric three-dimensional display systems are known. For example, one such system is disclosed in U.S. Pat. No. 3,493,290 issued to Traub. The system disclosed in the Traub patent includes a volumetric display member comprising a flexible membrane mirror.

One feature of volumetric three-dimensional displays is that the perspective view of the displayed image changes as the viewing angle to the display member is altered. This enhances three-dimensional effect and allows the viewer to see the image from a wide range of viewing angles.

Typically, volumetric three-dimensional display systems include a console having user operable controls which are used to govern image projection onto the display member. Accordingly, it is critical that when a viewer is seated at such a console the viewer can maintain contact with the controls and thereby maintain continuous operable control over the displayed image. However, a viewer who is thus seated has a limited range within which the viewing angle to the display member may be altered without losing contact with the controls on the console. Accordingly, such a viewer is faced with the decision of either limiting viewing angle, thereby limiting the available perspective views, or increasing the available viewing angles but thereby losing contact with the controls of the console.

Such a console might be equipped with a remote control panel which would permit the viewer to substantially alter viewing angle without losing contact with the remote panel. However, control panels for volumetric three-dimensional displays are often complex and therefore do not permit easy remote operation or, in the event of remote operation, movement of the control panel may require the viewer to actually look at the control panel during operation and thereby lose contact with the image on the display. As a consequence console mounted controls are preferable.

It is, accordingly, an object of the present invention to provide a three-dimensional display system which permits the user to maintain contact with console mounted controls while changing the angular view of an image projected on a display member of that system.

It is another object of the present invention to provide a three-dimensional display system with means for precisely and effectively altering the viewing angle of the display member of that system.

Additional objects and advantages of the invention will be set forth in the description which follows and in part will be obvious from the description or may be learned by practice of the invention.

SUMMARY OF THE INVENTION

To achieve the foregoing objects, and in accordance with the purposes of the invention as embodied and broadly described herein, a three-dimensional display system is provided which comprises a volumetric display mechanism including a flexible membrane mirror; a console having user operated controls mounted thereon which govern image projection onto the membrane mirror; and a means for permitting a user of the console to maintain contact with the controls while changing the angular view of the image comprising a two axis remote control gimbal support for the mirror with the remote controls for the gimbal support being mounted on the console.

In different words, the three-dimensional display system of the subject invention comprises a display in which viewing perspective changes as a function of viewing angle and a means for altering the viewing angle comprising a two axis gimbal onto which the display is mounted.

DESCRIPTION OF THE PREFERRED EMBODIMENT

Figure 1:
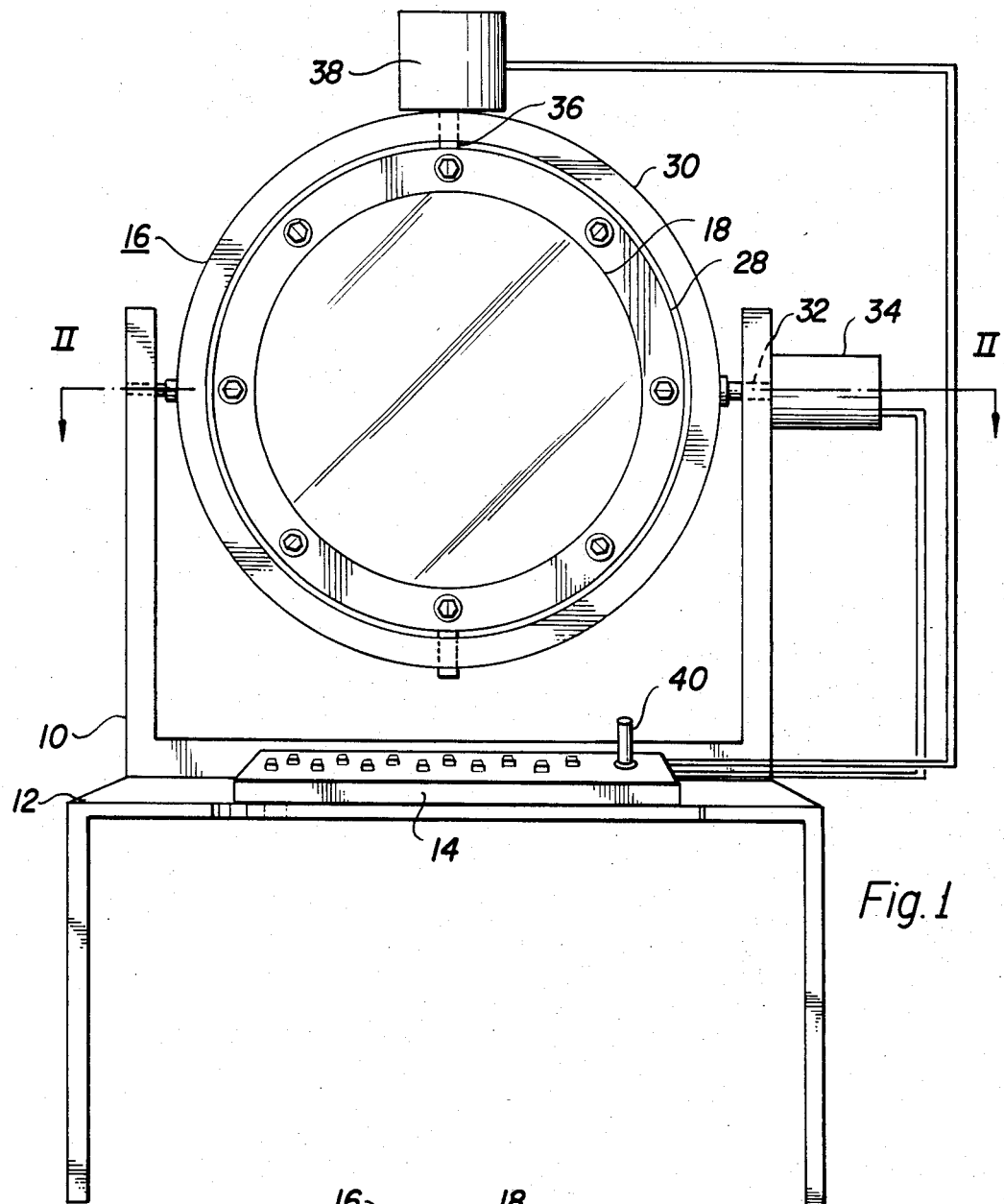
FIG. 1 is a perspective frontal view of a display system incorporating the teachings of the subject invention.
Figure 2:
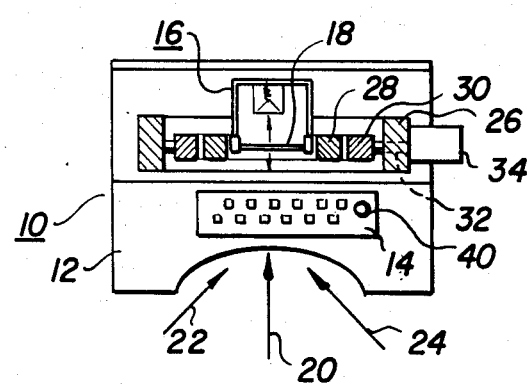
FIG. 2 is a top view of the system of FIG. 1 taken along line II—II.

In FIGS. 1 and 2 there is illustrated a console 10 having a bench portion 12 upon which there is mounted a control panel 14. Console 10 also supports a volumetric display mechanism 16 which includes a flexible membrane mirror 18 as should be well known to those skilled in the art. Mechanism 16 operates to deflect the shape of flexible mirror 18 in a manner whereby a volumetric display is made to appear on the surface of mirror 18. Viewing perspective of this volumetric display alters as a function of the viewing angle to mirror 18. For example, as shown in FIG. 2, one perspective view of the image displayed on mirror 18 is achieved at an angle presented by arrow 20 whereas different perspective views are achieved at viewing angles represented by arrows 22 and 24.

Control panel 14 provides operator controls for volumetric display system 18. These controls may include standard display controls such as display amplitude and contrast, and additional controls which alter the segment and the viewing angle of that segment of an object under observation which is displayed on mirror 18. In addition, controls on planar 14 may introduce linear cursors, planar segmentation, and other unique display criteria which are or may become available for volumetric display systems.

Typically, the operator controls included within panel 14 are physically mounted on console 10. Accordingly, it is difficult for a viewer to assume viewing angles 22 and 24 without losing contact with control panel 14. To assume those and even more extreme viewing angles, the subject invention contemplates the utilization of a two axis gimbal support 26 for mounting flexible mirror 18 onto console 10. Gimbal support 26 includes an inner ring 28 upon which flexible mirror 18 is mounted, an outer ring 30, a horizontal gimbal axis 32 with associate horizontal axis motor 34, and a vertical gimbal axis 36 with a corresponding vertical axis motor 38. Gimbal support 26, accordingly, allows for rotation of mirror around horizontal and vertical axes. These rotations have exactly the same effect with regard to changing the viewing angle as if the viewer were actually moving up and down or left and right. However, gimbal support 26 provides the added advantage that the operator can remain stationary, in a seated position at display console 10, and still be able to see the image from different viewing angles.

Gimbal motors 34 and 38 can be controlled in response to operator input through use of a control mechanism 40 mounted to control panel 14. Mechanism 40 may comprise a joy stick, thumb wheel, track ball or the like to control operation of motors 34 and 38. In the alternative, the viewing angle of mirror 18 can be altered through operation of motors 34 and 38 through external automatic control if a suitable computer system were employed. Such a computer system could, for example, detect the instantaneous orientation of mirror 18, determine a desired viewing angle necessary to display a particular perspective view of an image projected on mirror 18 and operate motors 34 and 38 to achieve this perspective view.

Additional advantages and modifications will readily occur to those skilled in the art. The invention in its broader aspects is, therefore, not limited to the specific details, representative apparatus and illustrative examples shown and described. Accordingly, departures may be made from the disclosed details without departing from the spirit or scope of applicant's generic inventive concept.

I claim:

1. A three-dimensional display system comprising:
   (a) a volumetric display mechanism including a flexible membrane mirror;
   (b) a console having user operator controls mounted thereon which govern image projection onto said mirror; and
   (c) means for permitting a user of said console to maintain contact with said controls while changing the angular view of said image comprising a two axis remote control gimbal support for said mirror with said remote control for said gimbal support included with said user operator controls.

2. A three-dimensional display system comprising:
   (a) a volumetric display mechanism including a flexible membrane mirror for viewing perspective changes as a function of viewing angle;
   (b) a console having user operator controls mounted thereon which govern image projection onto said mirror; and
   (c) means for altering said viewing angle comprising a two axis gimbal onto which said mirror is mounted including means, mounted on said control panel, for remotely altering the orientation of said gimbal.

3. The system of claim 2 wherein said means for altering includes motors for driving said axes of said gimbal and said means for remotely altering includes means for remotely controlling the operation of said motors.

4. The system of claim 3 wherein said means for controlling includes a thumb wheel.

5. The system of claim 3 wherein said means for controlling includes a track ball.

6. The system of claim 3 wherein said means for controlling includes a joy stick.

7. The system of claim 3 wherein said means for controlling includes a computer.

* * * * *